United States Patent [19]
Sowerby

[11] 3,780,294
[45] Dec. 18, 1973

[54] APPLICATIONS OF NUCLEAR RESONANCE FLUORESCENCE OF GAMMA RAYS TO ELEMENTAL ANALYSIS

[75] Inventor: Brian David Sowerby, Kirrawee, Australia

[73] Assignee: Australian Atomic Energy Commission, Congee, New South Wales, Australia

[22] Filed: May 5, 1971

[21] Appl. No.: 140,448

[30] Foreign Application Priority Data
May 6, 1970 Australia.................................. 1105

[52] U.S. Cl. ............................... 250/364, 250/84
[51] Int. Cl. .......................................... G01n 23/00
[58] Field of Search ................ 250/83.3 R, 83.6 W, 250/84

[56] References Cited
UNITED STATES PATENTS
3,654,464   4/1972   Johnson, Jr. et al. ....... 250/83.3 R X
3,171,961   3/1965   Yule............................ 250/83.3 R
3,234,099   2/1966   Baldwin et al. .................. 250/84 X Primary Examiner—Archie R. Borchelt
Attorney—Waters, Roditi, Schwartz & Nissen

[57] ABSTRACT

A method is provided for using nuclear resonance fluorescence of gamma rays for element analysis. The method involves irradiating a sample with gamma rays of the required critical energy and at the same time detecting the resonantly scattered radiation from the sample.

The technique is particularly adaptable to borehold prospecting, on-stream analysis in industry, the exploration of the ocean floor for mineral deposits, the analysis of the surface of planets and so forth.

6 Claims, 5 Drawing Figures

APPLICATIONS OF NUCLEAR RESONANCE FLUORESCENCE OF GAMMA RAYS TO ELEMENTAL ANALYSIS

The present invention relates to a new method of using nuclear resonance fluorescence of gamma rays for element analysis. The method involves irradiating a sample with gamma rays of the required critical energy and at the same time detecting the resonantly scattered radiation.

In the present method the velocity of the emitting nucleus is used to compensate for the recoil energy losses which occur when a gamma ray is emitted or absorbed. The most promising technique for producing gamma rays of the required energy is to use the recoil velocities in a gaseous radioisotope source.

The present technique could be used in borehole prospecting, in on-stream analysis in industry, in the exploration of the ocean floor for mineral deposits, for the analysis of the surface of planets etc. The application to borehole prospecting appears economically attractive as expensive diamond-core drilling would be eliminated if the borehole walls could be analysed by lowering a "logging" tool into a percussion-drilled hole.

Several other nuclear methods of element analysis are at present being developed in various laboratories for borehole logging applications. However, these techniques involve the complex interaction of neutrons with the borehole walls and are not readily applicable to the rapid determination of many commercially valuable minerals.

The invention in its broadest form comprises a device for quantitatively measuring the concentration of particular elements, comprising a source yielding gamma rays of the required critical energy, from a stable isotope of the element of interest, a detector for detecting gamma rays produced by resonance scattering due to the presence of the element of interest being measured and a shield to prevent the direct rays from the source reaching the detector.

DESCRIPTION OF THE NUCLEAR RESONANCE SCATTERING PROCESS

Resonance fluorescence is associated with the high probability for a nucleus to be excited by a photon if the photon energy is slightly greater than the energy of one of the levels of the nucleus. If the excited nucleus decays by the re-emission of the photon, the process is usually referred to as resonance scattering.

A $\gamma$-ray emitted from a nucleus initially at rest always has an energy which is slightly less than the energy difference between the two energy levels involved because the emitting nucleus takes a small portion of the energy available from the recoil. This recoil energy loss is equal to $E^2/2Mc^2$ where E is the $\gamma$-ray energy, M the mass of the nucleus and c the velocity of light. The same amount of kinetic energy is transferred to the nucleus which is excited by the $\gamma$-ray so that the total energy displacement amounts to $\Delta E = E^2/Mc^2$. If this energy difference is large compared to the width of the level, as is generally the case, the cross section for resonance scattering is extremely small.

To date, the most frequent application of nuclear resonance fluorescence has been in the determination of the lifetimes of nuclear energy levels. A variety of methods which involve shifting and/or broadening the emission line have been suggested to achieve the resonance condition. These methods utilize either (i) mechanical motion, (ii) thermal agitation (iii) recoil velocity from a previous radioactive decay, (iv) recoil velocity from a nuclear reaction of (v) a continuous $\gamma$-ray spectrum (e.g. Bremsstrahlung). The use of methods other than (iii) above are discussed in the final section of the present patent specification.

For element analysis applications in boreholes and industry, the method utilizing the recoil velocity from previous radioactive decay is most promising. However the lifetimes of most of the levels populated in radioactive decays (typically $^-10^{-12}$ sec) are longer than the slowing-down times in solids or liquids ($\sim 10^{-13}$ sec for the recoil energies usually encountered). This means that, in order to utilize the recoil from the preceding radiation, gaseous sources have to be used.

The cross section for resonance fluorescence averaged over the incident spectrum is:

$$\sigma = (g_2/g_1)(2.53/E^2 \tau)(N(E)/N) \ldots \quad (1)$$

where E is the resonance energy in MeV, $\tau$ the mean lifetime of the level in picoseconds, $g_1$ and $g_2$ are the statistical weights of the ground and excited states respectively (equal to $2J + 1$ where J is the spin of the state) and $N(E)/N$ is the fraction of emission $\gamma$ rays which overlap the absorption line. The cross section calculated using this expression is in units of barns.

In a scattering experiment the resonance process competes with inelastic scattering (i.e., Compton scattering) as well as non-resonant elastic scattering (i.e., Rayleigh and Thomson scattering). Calculations indicate that resonance scattering in several orders of magnitude more probable than Rayleigh or Thomson scattering using a gaseous 60Co source in a typical borehole containing 5 percent nickel.

THE USE OF GASEOUS SOURCES

Survey of Possible Applications

The application of this method is limited by the availability of suitable radioisotopes which, in decaying to a stable isotope of the element of interest, yield a strong $\gamma$ ray which decays to the ground state.

For a radioisotope to be suitable, sufficient energy must be available in the decays preceding the $\gamma$ ray of interest to produce overlap between the emission and absorption lines (i.e., to produce nonzero $N(E)/N$). An exception to this condition exists for electron capture and internal conversion decays in which multiple Auger processes which follow the radioactive decay can lead to disruption of the molecule containing the radioisotope with velocities which are often sufficient to restore the resonance condition.

Other factors which must be considered in determining the feasibility of analyzing a particular element include: (i) the percentage abundance of the stable isotope participating in the resonance fluorescence process, (ii) the fraction of radioactive decays yielding the $\gamma$ ray of interest, (iii) possible background from higher-energy $\gamma$ rays which will be Compton scattered in the sample, (iv) the lifetime of the source, (v) the lifetimes of the levels involved in the decay compared to the slowing down times, (vi) the availability of suitable compounds of the source element which are volatile and chemically stable at temperature less than the practical upper limit of about 1,200° C, (vii) the availability of high specific activity source material so that source volume and pressure can be kept to a minimum. = m—

The results of a survey of the possible application of the γ-ray nuclear resonance scattering method to a wide range of elements are given in Table 1. In calculating the resonance cross section using equation (1), $N(E)/N$ was determined using the expression:

$$N(E)/N = (D/E_m)(1 = (\tfrac{1}{3} E/E_m) \ldots \quad (2)$$

where $E_m$ = maximum Doppler shift from the recoils, $\Delta E$ = energy difference between the centroids of the emission and absorption lines and $D$ = width of the absorption line.

Experimental Investigations in Simulated Boreholes

The feasibility of applying the γ ray nuclear resonance technique to element analysis has been investigated in simulated boreholes. Samples containing known concentrations of copper and nickel were studied using sources of 65Zn I$_2$ and 60CO Br$_2$ respectively. Copper and nickel were chosen because of their economic importance and favourable resonance cross sections (ref. table 1).

The invention is illustrated in the accompanying drawings in which.

Figure 1:
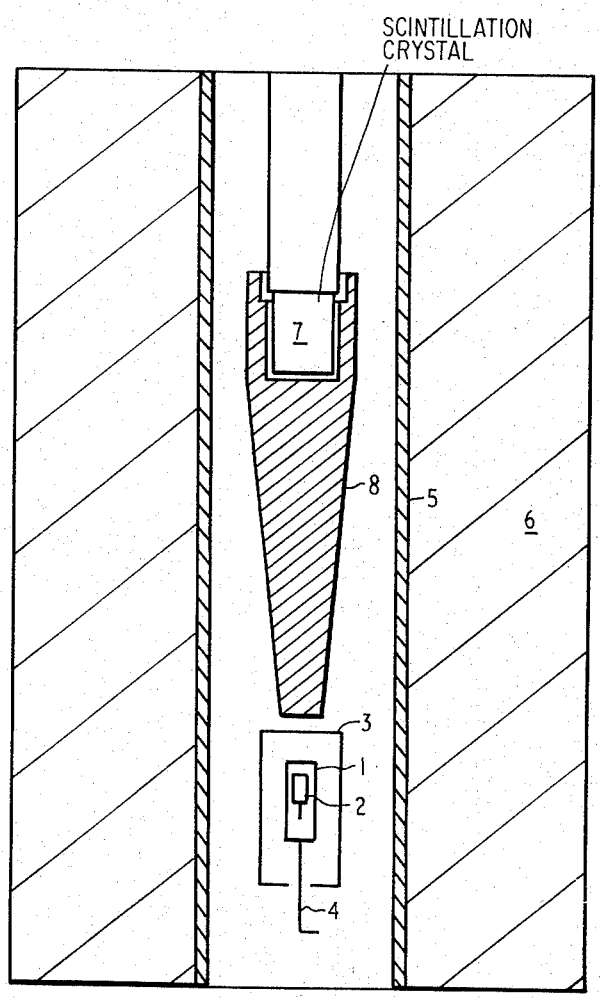
FIG. 1 is a diagrammatic representation of a gamma ray source set up in a bore hole and separated from a scintillation crystal by a suitable shadow bar.
Figure 3:
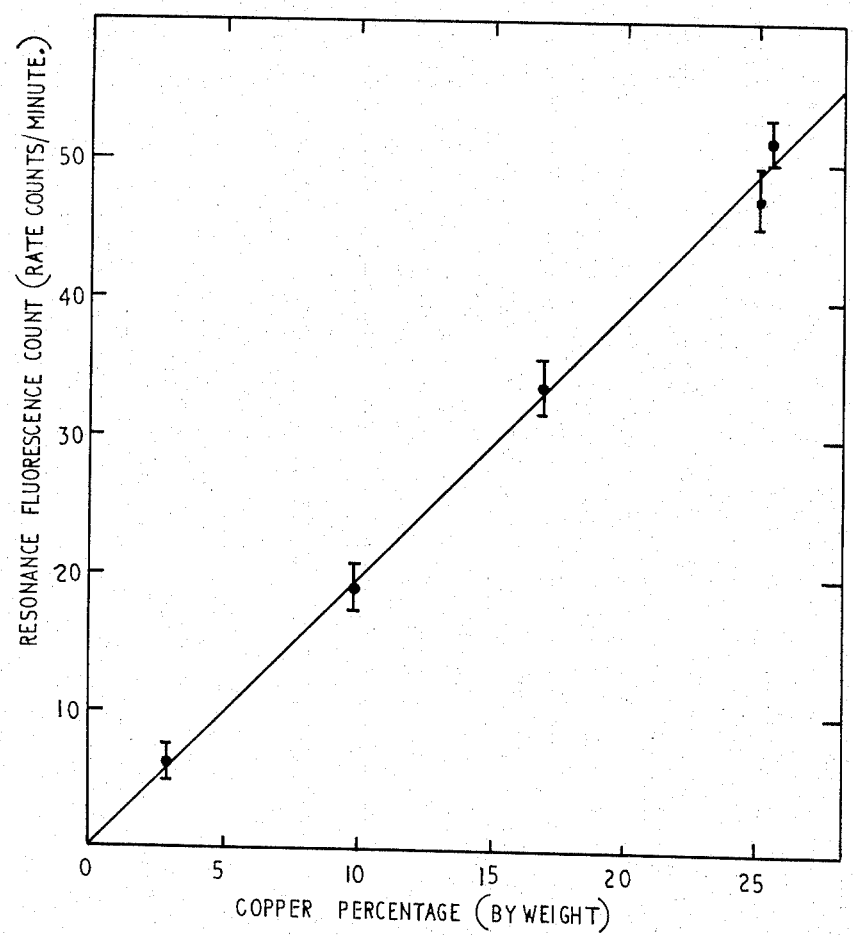
Figure 4:
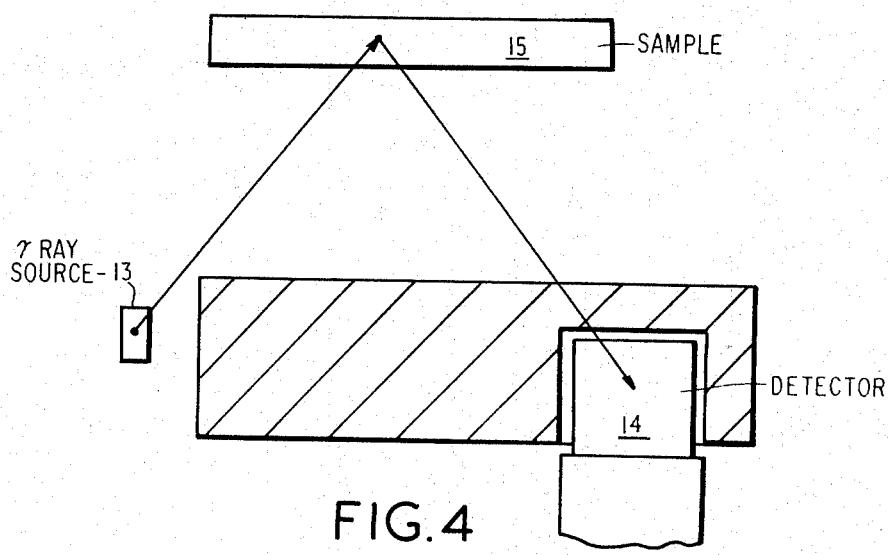
Figure 5:
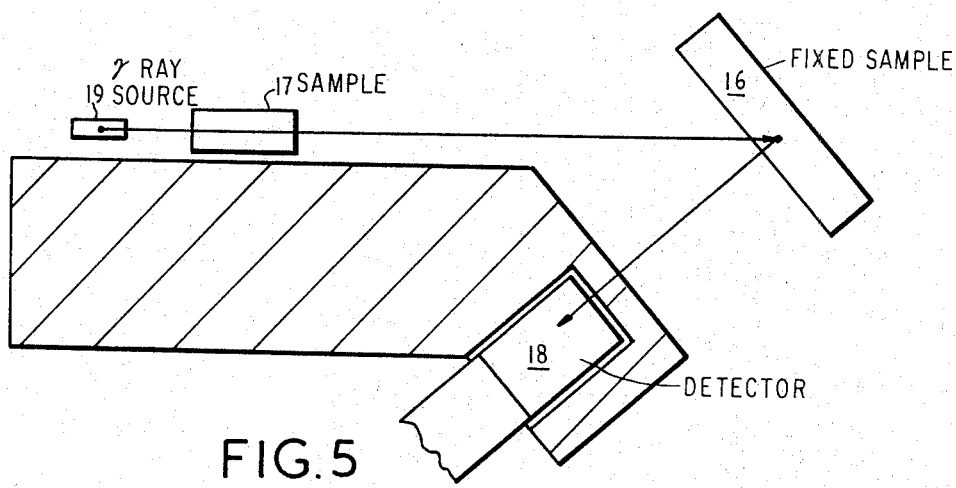

FIG. 3 graphically illustrates the behavior of the resonance count rate as a function of copper concentration in the sample shown in FIG. 1; and FIG. 4 and FIG. 5 are alternative arrangements of gamma ray sources, samples to be tested, and scintillation detectors.

Spectra were accumulated for each experimental set-up with the source in the vapour and solid phases and with the source removed. The important experimental parameters measured were:

i. $C_v$ = the resonance count rate in an energy channel around the photopeak (i.e., the difference between spectra obtained with the source in the vapour and solid phases).
ii. $C_s$ = the source-induced background count rate in the same energy channel (i.e., the solid source minus room background spectra)
iii. $C_b$ = the room background count rate in the same energy channel
iv. $C_T$ = the integral count rate.

A diagram of a typical experimental set-up is shown in FIG. 1. A welded stainless-steel can 1 containing the source material in an evacuated, sealed silica ampoule 2 was placed in an insulated furnace 3 as shown; the temperature of the can 1 was measured using a Cr-Al. thermocouple 4. The borehole consisted of an aluminum tube 5 surrounded by a sample 6 of known composition and density. The source 2 was separated from a NaI(Tl) scintillation crystal 7 by a tapered lead shadow bar 8.

Figure 2:
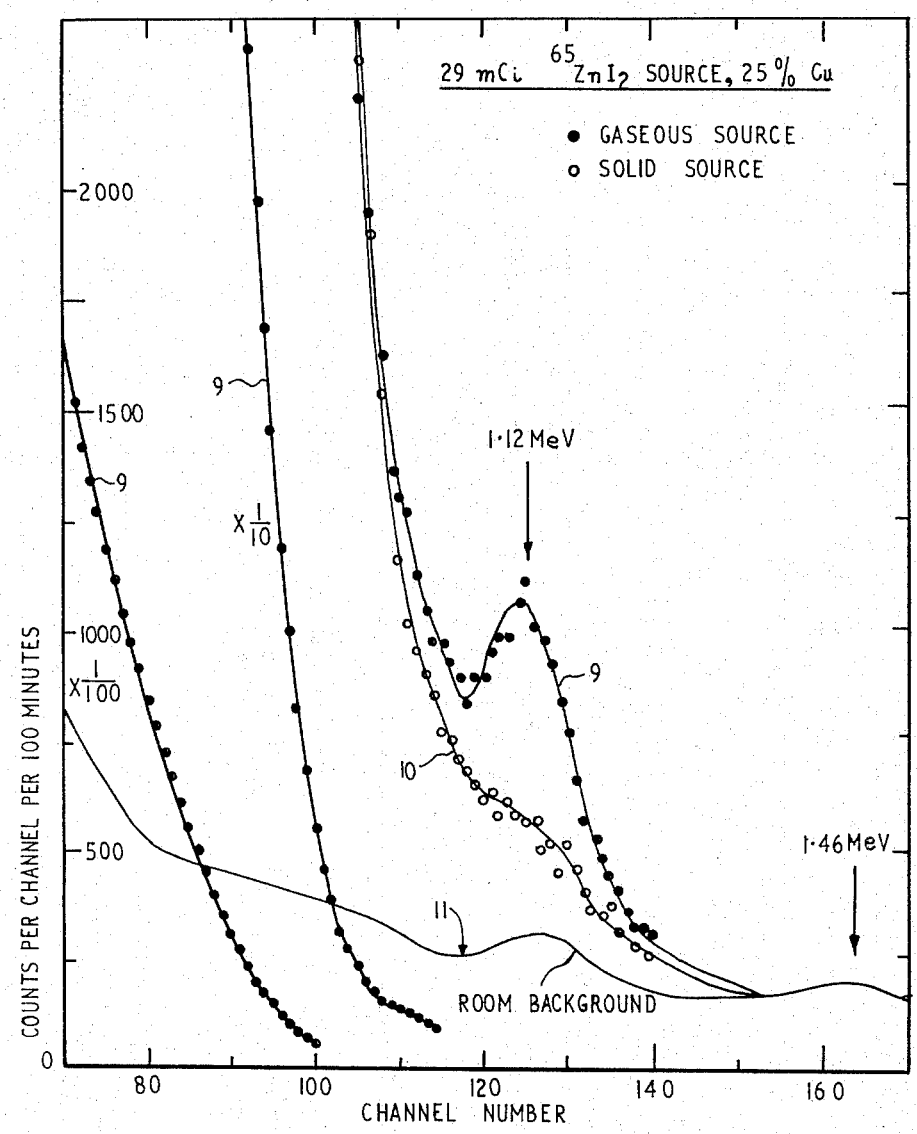
FIG. 2 is a graphic representation of pulse-height spectra obtained from the set-up shown in FIG. 1.

FIG. 2 shows pulse-height spectra obtained with a 29 mCi 65Zn I$_2$ source in the geometry illustrated in FIG. 1 using a 24.8 percent copper scattering sample. Spectra obtained using a gaseous source 9 (temperature ≈ 700° C), a solid source 10 and with the source removed 11 (i.e., room background) are shown. The count rates in an energy channel (1.04 to 1.20 MeV) around the photopeak and the total count rate were: $C_v = 56.6 \pm 1.6$ counts/minute, $C_s = 51.3 \pm 1.1$ counts/minute, $C_b = 56.9 \pm 0.5$ counts/minute and $C_T = 7.8 \times 10^3$ counts/second.

The behavior of the resonance count rate as a function of Cu concentration was investigated using a 29 mCi 65Zn I$_2$ source and six scattering samples (from 0 percent to 25.5 percent Cu). At least three runs were performed for each sample with the source in the vapor and solid phases and with the source removed, the runs generally being of 50 minutes duration. The resonance count rate of $8.1 \pm 1.2$ counts/minute observed with the 0 percent Cu sample was due to the different source distributions for gaseous and solid sources and has been subtracted from the points shown in FIG. 3. This source geometry effect can be minimized by the use of small volume sources and by shield design.

Measurements were performed on the resonance scattering of 60Co gamma rays from nickel in a geometry similar to that shown in FIG. 1 except that the 1 ¾ inches × 2 inches NaI (Tl) detector was replaced by a 1½ inches × 1 inch NaI(Tl) detector and the shielding increased accordingly (leaving the outside diameter unchanged). The count rates in an energy channel (1.24 to 1.42 MeV) around the 1.33 MeV photopeak for a 7 mCi 60Co Br$_2$ source and nickel sulphate scatterer were: $C_v = 6.0 \pm 0.4$ counts/min, $C_s = 2.4 \pm 0.4$ counts/min, $C_e = 12.9 \pm 0.3$ counts/min. The total count rate ($C_T$) under these conditions was $6.4 \times 10^3$ counts/second.

The ratio of resonance to total count rate can be improved by increasing the shielding thickness around the detector, replacing the lead with a more effective gamma ray shield (e.g. tungsten alloy), varying the shadow bar design or replacing the NaI(Tl) with a detector with a higher peak/total ratio (e.g. CsI(Na)).

The source-induced background could derive from low-angle Compton Scatter, direct transmission through the shadow bar, non-resonant elastic scattering of source γ rays and/or electronic pulse summing. Experiments have shown that the major cause of this background is pulse summing and that it can be reduced significantly by electronic pile-up rejection techniques. The use of high resolution gamma-ray detectors (e.g. solid-state Ge(Li) detectors) would greatly increase the ratio of resonance/background although the need to operate these detectors at liquid nitrogen temperatures and their sensitivity to vibration prevents their immediate application to many industrial problems.

DISCUSSION OF POSSIBLE APPLICATIONS

The results of the present preliminary investigations on the use of gaseous sources in laboratory boreholes suggest that nuclear resonance scattering of gamma rays is a promising technique for quantitative element analysis.

The main advantage of the nuclear resonance scattering technique over other nuclear techniques of element analysis is that, apart from a very small contribution from non-resonant elastic scattering, the scattered full-energy gamma rays originate only from the isotope of interest. This high degree of selectivity is not shared by any other nuclear analysis technique. Another important advantage of the gamma-ray resonance technique is its simplicity. A practical borehole tool could consist of a source-shield-detector assembly similar to that shown in FIG. 1 together with an amplifier, a pile-up rejector, a gain stabilizer, a single-channel analyser and a scaler.

Although the resonance count rates observed in the present experiments are low there is no reason in principle why sources of, say, 100 curies cannot be used in boreholes. However in practice the upper limit to the achievable resonance fluorescence count rate is determined by the maximum count rate which can be handled by the detector and its associated electronics. The means of improving the ratio of resonance to total count rates and of reducing the source-induced background have been discussed in the previous section.

In applying this technique to borehole logging one could use two detector-shield arrangements (one on each side of the source) to double the resonance count rate. Also it would probably be advisable to subtract the count rates obtained with a solid source from those obtained with the gaseous source; this would reduce the dependence on count rate variations caused by changes in geometry and sample density as well as correcting for natural $\gamma$ ray backgrounds.

For on-stream analysis applications in industry one has much more freedom in the selection of scattering angles, detector/shield configurations etc., and so it will be possible to improve the ratio of resonance to Compton count rates. For example one could use a geometry similar to that shown in FIG. 4; gamma rays from the source 13 are scattered from the sample 15 and are detected using the scintillation or solid-state detector 14.

An alternative approach is to selectively absorb gamma rays of the resonance energy in the sample to be analyzed 17 and to observe variations in the number of gamma rays resonantly scattered from a fixed sample 16. In the experimental set-up shown in FIG. 5, the resonance count rate in the detector 18 will be inversely proportional to the number of resonant $\gamma$ rays from the source 19 which are scattered by the sample 17. To correct for sample thickness and density one could use the intensity of Compton scattered radiation observed in the detector 18 or one could separately measure the transmission of, say, 137Cs $\gamma$ rays through the sample.

As was pointed out earlier, alternative methods exist for the production of $\gamma$ rays with the required energy for resonance scattering. Although not as favorable as the method using gaseous sources these methods also have possible applications to element analysis:

i. Mechanical motion. The recoil energy loss of $E^2/Mc^2$ corresponds to a Doppler velocity of $E/Mc$; for $E < 500$ keV in heavy nuclei this amounts to a few times $10^4$ cm/sec. Unfortunately the velocities which can be achieved in practice (e.g. using a centrifuge technique) limit the application of this method to low energy gamma rays in heavy nuclei.

ii. The thermal method uses heating of the source to increase the Doppler width and to therefore increase the number of resonant gamma rays. However this method is even more restricted than the mechanical motion technique to low energy gamma rays in heavy nuclei.

iii. Nuclear reactions. The use of nuclear reactions offers some interesting possibilities using bombarding particles from either radioisotope sources (e.g. alpha-particle emitters) or accelerators. Because of the higher excitation of the levels involved compared to those typically encountered in radioactive decays, a large fraction of the levels are sufficiently short-lived to exhibit Doppler broadening even for solid targets. However this broadening is often orders of magnitude larger than is needed for the compensation of the recoil energy losses and consequently background is a more serious problem than for gaseous radioisotope sources. As an example of the type of application considered, one could use a source of aluminum powder mixed with an alphaemitter to obserbe resonance scattering from 30Si using gamma rays from the 27Al($\alpha, p \gamma$) 30 Si reaction.

iv. Continuous Gamma-Ray Spectra (e.g. Bremsstrahlung). The narrowness of nuclear resonance absorption lines makes it difficult to use a continuous $\gamma$ ray spectrum for nuclear resonance applications as a consequence of very low resonance-to-background levels. An advantage of the technique is that several elements can be measured simultaneously. However, any possible applications would require the use of high resolution $\gamma$-ray detectors (e.g. a solid-state Ge(Li) detector.

TABLE 1

Elements for which the $\gamma$-ray nuclear resonance scattering technique has possible applications. All elements with Z 35 and some elements with Z > 35 have been investigated. Sources with half-lives < 2 days and isotopes of abundance ** < 1 percent have not been considered.

| Element | Source | Half Life | Gamma-Ray Energy (MeV) | Resonance cross section (0)x fractional abundance** ($\times 10^{-2}$) |
|---|---|---|---|---|
| Li | 7Be | 5.3 d | 0.48 | 198.3* |
| Ca | 44Ti | 48 y | 1.16 | 0.01 |
| Ti | 46Sc | 84 d | 0.89 | 0.42 |
| Ti | 48V | 16 d | 0.98 | 3.94 |
| V | 51Cr | 28 d | 0.32 | 0.03* |
| Cr | 52Mn | 5.7 d | 1.43 | 6.30 |
| Cr | 54Mn | 303 d | 0.84 | 0.03* |
| Fe | 56Co | 77 d | 0.85 | 3.18 |
| Ni | 60Co | 5.3 d | 1.33 | 1.94 |
| Cu | 65Zn | 245 d | 1.12 | 2.41* |
| Zn | 66Ni | 2.3 d | 1.04 | 1.66 |
| Ge | 72Se | 8.4 d | 0.83 | 2.92 |
| Ge | 74As | 18 d | 0.60 | 2.56 |
| As | 75Se | 120 d | 0.27 | 0.68* |
| Zr | 92Nb | 10 d | 0.93 | 0.36* |
| Mo | 96Tc | 35 d | 0.78 | 2.12 |
| Pd | 105Ag | 40 d | 0.34 | 0.004 |
| Cd | 111Ag | 7.5 d | 0.34 | 1.06 |
| Sn | 118Te | 6 d | 1.23 | 0.16 |
| Sn | 122Sb | 2.8 d | 1.14 | 0.59* |
| I | 127Xe | 36 d | 0.37 | 0.15* |
| Cs | 133Ba | 7.2 y | 0.38 | 0.21* |
| W | 183Re | 115 d | 0.29 | 0.02* |
| W | 184Re | 71 d | 0.90 | 1.59* |
| Pt | 194Os | 6 y | 0.33 | 5.27 |
| Pt | 196Au | 6.2 d | 0.69 | 0.24* |
| Hg | 198Au | 2.7 d | 0.41 | 2.14 |
| Hg | 202Tl | 12 d | 0.44 | 0.15* |
| Tl | 203Hg | 47 d | 0.28 | 0.58 |
| Pb | 206Bi | 6.2 d | 0.83 | 1.66 |
| Pb | 207Bi | 30 y | 0.57 | 0.21 |

* Electron capture decays for which N(E)/N was calculated assuming a 1 percent overlap per eV at the absorption line.
** Natural abundance of the stable isotope in the sample which is resonantly excited by gamma rays from the source.

What I claim is:

1. A device for quantitatively measuring the concentration of a particular element, said device comprising a gaseous radioisotope source decaying via a stable isotope of the element and yielding γ-rays of the critical energy required for resonance scattering, in which source the motion of the γ-emitting nucleus following previous radioactive decays is used to Doppler broaden the energy of the emitted γ-ray so that a proportion of these γ-rays are of the required critical energy, a shield to prevent the direct γ-rays from the source reaching the detector, and a detector for detecting resonantly scattered γ-rays from the element being measured.

2. A device for quantitatively measuring the concentration of a particular element, said device comprising a gaseous radioisotope source decaying via a stable isotope of the element and yielding γ-rays of the critical energy required for resonance scattering, in which source the motion of the γ-emitting nucleus following previous radioactive decays is used to Doppler broaden the energy of the emitted γ-ray so that a proportion of these γ-rays are of the required critical energy, a shield to prevent the direct γ-rays from the source reaching the detector, and a detector for detecting resonantly scattered γ-rays which have been attenuated by the element being measured.

3. A device for quantitatively measuring the concentration of a particular element, said device comprising a source of γ-rays of the required critical resonance energy, a shield to prevent the direct γ-rays from the source reaching the detector, and a detector for detecting resonantly scattered γ-rays from the element being measured, said source of γ-rays comprising an intimate mixture of a radioisotope source and a target material so that particles from the radioactive decay induce nuclear reactions on colliding with the target material, and in which motion of the γ-emitting nucleus following the nuclear reaction is used to Doppler broaden the energy of the emitted γ-ray so that a proportion of these γ-rays are of the required critical energy.

4. A device for quantitatively measuring the concentration of a particular element, said device comprising a source of γ-rays of the required critical resonance energy, a shield to prevent the direct γ-rays from the source reaching the detector, and a detector for detecting resonantly scattered γ-rays which have been attenuated by the element of interest being measured, the source of γ-rays comprising intimate mixture of a radioisotope source and a target material so that particles from the radioactive decay induce nuclear reactions on colliding with the target material, and in which motion of the γ-emitting nucleus following the nuclear reaction is used to Doppler broaden the energy of the emitted γ-ray so that a proportion of these γ-rays are of the required critical energy.

5. A device as claimed in claim 1 comprising a γ-ray scatterer and wherein the sample to be analyzed is placed between the source and the scatterer of the element being measured, the resonantly scattered γ-rays from said scatterer being measured in the detector.

6. A device as claimed in claim 3 comprising a γ-ray scatterer and wherein the sample to be analyzed is placed between the source and said scatterer of the element measured, the resonantly scattered γ-rays from said scatterer being measured in the detector.

* * * * *